(12) United States Patent  
Zweig

(10) Patent No.: US 9,786,053 B2  
(45) Date of Patent: Oct. 10, 2017

(54) OPTICAL MEASURING DEVICE

(71) Applicant: ZephaVision, LLC, Randolph, NJ (US)

(72) Inventor: David Zweig, Randolph, NJ (US)

(73) Assignee: ZephaVision, LLC, Randolph, NJ (US)

( * ) Notice: Subject to any disclaimer, the term of this patent is extended or adjusted under 35 U.S.C. 154(b) by 7 days.

(21) Appl. No.: 15/062,663

(22) Filed: Mar. 7, 2016

(65) Prior Publication Data

US 2016/0260218 A1 Sep. 8, 2016

Related U.S. Application Data

(60) Provisional application No. 62/129,459, filed on Mar. 6, 2015.

(51) Int. Cl.
```
G06T 7/00      (2017.01)
G06T 7/60      (2017.01)
G06T 5/00      (2006.01)
G06T 7/80      (2017.01)
```

(52) U.S. Cl.
CPC ............ *G06T 7/0018* (2013.01); *G06T 5/006* (2013.01); *G06T 7/80* (2017.01); *G06T 2207/10056* (2013.01)

(58) Field of Classification Search
CPC ................................ H04N 9/10; G06T 7/0018
USPC ......................................................... 348/188
See application file for complete search history.

(56) References Cited

U.S. PATENT DOCUMENTS

| | | | |
|---|---|---|---|
| 4,055,376 A | 10/1977 | Daberko | |
| 5,164,750 A | 11/1992 | Adachi | |
| 5,402,224 A | 3/1995 | Hirukawa et al. | |
| 5,586,058 A | 12/1996 | Aloni et al. | |
| 5,686,960 A * | 11/1997 | Sussman | G02B 26/106 348/218.1 |
| 6,026,172 A | 2/2000 | Lewis et al. | |
| 7,054,000 B2 | 5/2006 | Nikitin et al. | |
| 7,068,426 B2 | 6/2006 | Bruehl et al. | |
| 7,526,118 B2 | 4/2009 | Davis et al. | |
| 8,311,311 B2 | 11/2012 | Bryll et al. | |
| 8,401,269 B2 | 3/2013 | Laroche et al. | |
| 8,576,390 B1 * | 11/2013 | Nunnink | G01M 11/0228 356/126 |

(Continued)

OTHER PUBLICATIONS

Bryan Burnett and Steven Blaauw, "Macro Imaging with Digital Cameras," Microscopy Today, p. 32-35, Jul./Aug. 2003.

(Continued)

*Primary Examiner* — Michael Lee  
*Assistant Examiner* — Justin Sanders  
(74) *Attorney, Agent, or Firm* — Gearhart Law LLC

(57) ABSTRACT

A system and method of calibrating and measuring optical properties of an imaging optical device is disclosed in which a structure of uniformly periodic linear elements is imaged using the optical device being calibrated. This image is obtained with the optical axis of the device at an angle α with respect to a normal to the uniformly periodic structure. This is done by situating the linear elements on the hypotenuse of a wedge, i.e., a right-angled triangular prism. The image is then taken with the optical axis of the optical device oriented vertically. An advantage of the arrangement is that the structure of uniformly periodic linear elements does not need to be carefully focused making the system quick and easy to implement.

21 Claims, 10 Drawing Sheets

(56) References Cited

U.S. PATENT DOCUMENTS

| | | |
|---|---|---|
| 8,581,162 B2 | 11/2013 | Campbell |
| 8,766,165 B1 | 7/2014 | Zhovnirovsky et al. |
| 2005/0134863 A1* | 6/2005 | De Lega ............ G01B 9/02039 356/512 |
| 2006/0060781 A1* | 3/2006 | Watanabe .............. B82Y 10/00 250/310 |
| 2012/0224172 A1 | 9/2012 | Goodwin et al. |
| 2013/0293869 A1 | 11/2013 | Mengel et al. |
| 2014/0169637 A1 | 6/2014 | Zuest et al. |

OTHER PUBLICATIONS

SpyderLENSCAL, "Your SpyderLENSCAL Guidebook," p. 1-7.

Optikos Corporation, "How to Measure MTF and other Properties of Lenses", Rev. 2.0 #4-04-001, Jul. 16, 1999.

Wyant, James, "1.0 Measurement of Paraxial Properties of Optical Systems" Course Notes, University of Arizone, Tuscon, AZ.

Camacho, et al., "Simple method to measure the focal length of lenses," Opt. Eng. 41(11), 2899-2902 (Nov. 1, 2002). doi:10.1117/1.1511543.

Mayak, et al., "Inteiferometric measurement of back focal length and insertion loss of precison microlens arrays," Gradient Index, Miniature, and Diffractive Optical Systems II, Thomas J. Suleski, Editor, Proceedings of SPIE vol. 4437 (2001) © 2001 SPIE.

De Nicola, et al., "Reflective grating interferometer for measuring the focal length of a lens by digital moiré effect," Optics Communications, vol. 132, Issues 5-6, Dec. 15, 1996.

Edmund Optics, "Wedge Device", http://www.edmundoptics.com/testing-targets/test-targets/image-analysis-test-targets/dof-5-15-depth-of-field-target/1485, accessed May 10, 2016.

Edmund Optics, "Wedge Device", http://www.edmundoptics.com/test-targets/image-analysis-test-targets/eo-telecentricity-target/2670/, accessed May 10, 2016.

* cited by examiner

111

121

OPTICAL MEASURING DEVICE

CLAIM OF PRIORITY

This application claims priority to U.S. Application Ser. No. 62/129,459 filed on Mar. 6, 2015, the contents of which are herein fully incorporated by reference in its entirety.

FIELD OF THE INVENTION

This invention relates to the calibration of an imaging system and to the measurement of fundamental and operational properties of an optical system including magnification, focal length, field curvature, distortion, and depth of focus.

BACKGROUND OF THE INVENTION

Magnifying systems such as microscopic imaging systems are commonly used for conducting research, quantitative characterization and screening in various applications, such as semiconductors fabrication, pharmaceutical research, biomedical and biotechnology laboratories, aerospace and automotive parts manufacturing.

In order to accurately and precisely compute the spatial properties of the elements being imaged, a microscopic imaging system must be calibrated beforehand. Calibration parameters are typically obtained by measuring attributes of a reference image taken of an object having known physical dimension and shape. The calibration parameters can be complex, as their purpose is to compensate for many types of deformations and in-homogeneities introduced by the imaging system. Existing calibration procedures, therefore, tend to be complex, time consuming and usually require skilled technicians to perform them.

Simpler, less time consuming yet accurate calibration tools and methods are therefore desirable.

DESCRIPTION OF RELATED ART

US Patent Application 20140169637 to Reto Zuest et al. published on Jun. 19, 2014 entitled "Method for Self-Calibration of a Microscope Apparatus"" that describes a method for calibrating a microscope apparatus having a variable optical magnification system and a detector device is disclosed. First, a calibrating mode is performed, wherein an image of an object is captured at a known reference magnification value, two characteristic reference points are determined in the image, a reference distance between the two reference points is determined, and a correlation is determined between the reference distance and the reference magnification value. Later, a measuring mode is implemented, in which a current image of the object is captured at a second magnification value, the two characteristic reference points are identified therein, a current distance between the current reference points is determined, and the second magnification value is determined from the current distance based on the correlation between the reference distance and the reference magnification value.

U.S. Pat. No. 8,401,269 to Laroche et al. issued on Mar. 19, 2013 entitled "System and method for automatic measurements and calibration of computerized magnifying instruments"" that describes a system and method for automatic measurements and calibration of computerized magnifying instruments. More particularly, the method includes an automatic calibration aspect, which includes obtaining an optimized digital image of a reference object including at least one standardized landmark feature, and establishing calibration parameters based on one or more measured attributes of the landmark feature. The method further describes a calibration aspect, which includes providing calibration parameters, obtaining a digital image including at least one known attribute, measuring at least one known attribute and comparing the measured value with the known value. The method further includes an aspect of automatic measurement of an attribute of one or more object, which includes retrieving calibration parameters, acquiring a digital image and measuring the attribute. The system includes an object support, a reference object including one or more standardized landmark features, and an automatically readable identification means.

U.S. Pat. No. 4,055,376 to Daberko issued on Oct. 25, 1977 entitled "Calibration reticle for measuring microscopes"" that describes a calibration reticle for measuring microscopes is disclosed in which a calibrated distance is established by calibration reference lines whose locations are defined by selected features of the calibration pattern. Preferably, the calibration reference lines are not physically manifest on the calibration reticle, except by the selected features which specify the locations of the calibration reference lines.

U.S. Pat. No. 6,026,172 to Lewis, Jr. et al. issued on Feb. 15, 2000 entitled "System and method for zoom lens calibration and method using same"" that describes using marks of known dimensions and size, and spacing, a zoom lens may be calibrated in either or both the X and Y spatial directions. A system comprising an image capture device, positioning means, position encoder means, operator interface, and processing unit permits this method to be advantageously applied to a wide variety of web inspection/control functions, including but not limited to initial web registration, multiple color ink registration, lateral web positioning, repeat length calculations, image capture synchronization, thermal/mechanical differential compensation, and accurate registration of objects within an image to other objects within an image or to a mechanical reference on a machine. Since the Zoom Calibration method permits a system to be constructed with both wide/variable field of view and accurate distance measurement positioning and calibration, all of the web inspection/control functions traditionally used in the web printing industry may be implemented with a single inspection/control system using a multitasking approach with the same inspection/control hardware. This permits rapid implementation of old and new web inspection/control functions at a greatly reduced cost as compared to traditional fixed lens systems, as well as permitting a degree of automation, remote access, diagnostic control, quality assurance, and product quality control heretofore not possible with conventional web inspection/control systems.

BRIEF SUMMARY OF THE INVENTION

An inventive system and method of calibrating and measuring optical properties of an imaging optical device is disclosed.

In a preferred embodiment, a structure of uniformly periodic linear elements is imaged using the optical device being calibrated or measured. This calibration image is preferably obtained when the optical device is oriented with its optical axis at an acute angle $\alpha$ with respect to a normal to the uniformly periodic structure. This angle $\alpha$ is preferably in a range of 5 to 85 degrees. However, in some embodiments, the angle may range from 0 to 5 degrees. This arrangement may be facilitated by, for instance, having a device in which the linear elements are situated on the hypotenuse of a wedge, with the wedge being shaped as a right-angled triangular prism. The optical axis then only has to be vertical, which may be easily and accurately achieved using a plumb-bob. One way to create such a device may be to have a precision Ronchi ruling plate fixed to the hypotenuse of an accurately machined wedge having an angle α between its base and the plane of its hypotenuse.

An advantage of the arrangement is that the structure of uniformly periodic linear elements does not necessarily need to be carefully focused in order to do the calibration. This latitude in performing the calibration in the manner of the present invention, may make the system quick and easy to use.

A first example of how this device may be used to obtain an optical property of an optical imaging device may be illustrated by the steps involved in determining its magnification.

First, a position of sharpest focus on the calibration image may be determined. This may be done by using image sharpness or contrast ratio, or a combination thereof to determine a quasi-periodic function representing the imaged periodic line elements. By determining the fundamental Fourier frequency of that function, and its quadrature function, a zero-phase angle between them may indicate the position of sharpest focus to sub-pixel accuracy. Having found the position of sharpest focus, the periodicity D in this region may be measured and compared to the periodicity d of structure of uniformly periodic linear elements. As the linear elements spaced with periodicity d are on a slope of angle α, the magnification may be calculated using the formula:

$$m = D/(d \cos(\alpha)) \quad (1)$$

where m is the magnification.

In a preferred embodiment, the calibration image may be a digital image, and it may be relayed to a computer. The computer may be programmed to automatically locate the position of sharpest focus, calculate the periodicity D at that region and, knowing the values of d and angle α, automatically calculate the magnification m using an algorithm that may incorporate equation 1.

As will be shown in the detailed description below, analogous measurements and calculations may also provide optical properties such as, but not limited to, focal length, field curvature, distortion, and depth of focus.

Enhancements and alterations may be made to the wedge discussed above. For instance a second structure of uniformly periodic linear elements may be attached to the side of the wedge. This second structure may be oriented on a plane parallel to the base of the wedge with the second linear elements also oriented parallel to the first. Such an arrangement may, for instance, be used in a situation where the optical axis of the optical imaging device may not be precisely normal to the base of the wedge. This second structure of uniformly periodic linear elements may then be used to calculate the actual angle between the normal to the hypotenuse plane of the wedge and the optical axis of the optical imaging device, as will be described in detail later.

One further embodiment of the device may be a device that may be folded flat for more economical storage, but then transformed into a wedge for use. This too is described in detail later.

Therefore, the present invention succeeds in conferring the following, and others not mentioned, desirable and useful benefits and objectives.

It is an object of the present invention to provide a quick and simple apparatus for, and method of, determining optical properties of an optical imaging system.

It is another object of the present invention to provide a robust, inexpensive yet highly accurate method of, determining optical properties of an optical imaging system.

Yet another object of the present invention is to provide a system that can automatically determine the magnification, focal length, field curvature, distortion, and depth of focus of an optical imaging system with a high degree of accuracy.

DETAILED DESCRIPTION OF THE INVENTION

Figure 1:
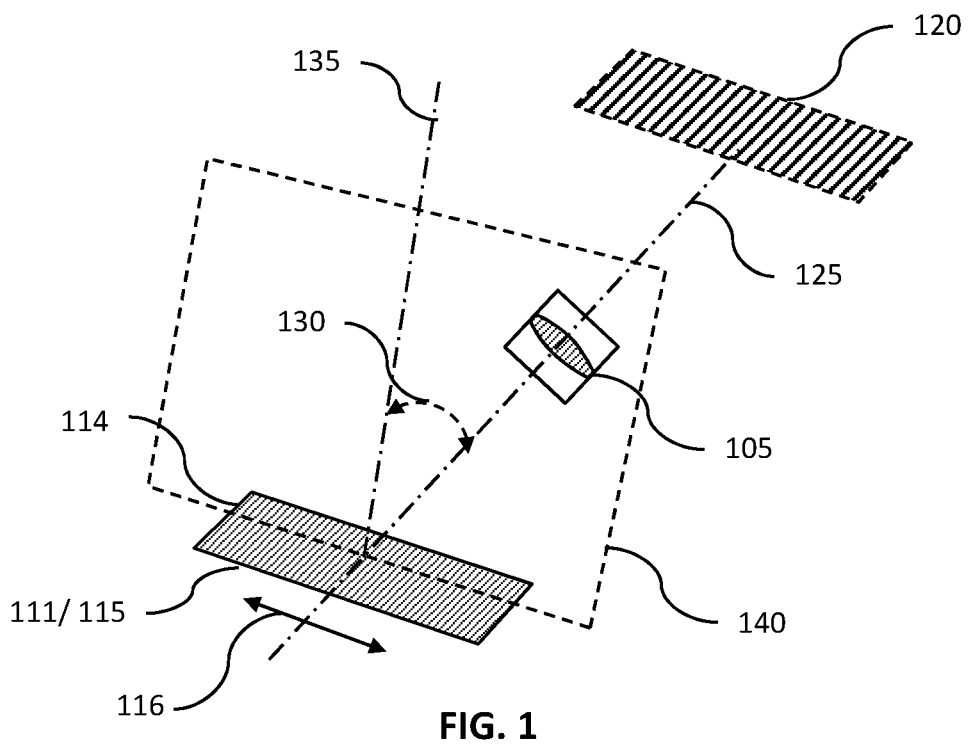
FIG. 1 shows an isometric schematic layout of an optical measuring device of the present invention.

The preferred embodiments of the present invention will now be described with reference to the drawings. Identical elements in the various figures are identified with the same reference numerals.

Various embodiments of the present invention are described in detail. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows an isometric schematic layout of an optical measuring device of the present invention. An imaging optical device 105 is shown imaging a structure of uniformly periodic linear elements 111 to create a calibration image 120. The structure of uniformly periodic linear elements 111 is preferably located on a first planar surface 115. The optical axis 125 of the optical device 105 is shown oriented at an angle acute angle α 130 with respect to the normal 135 of the first planar surface.

Both the normal 135 of the first planar surface and the optical axis 125 of the optical device are shown as being in a plane 140 normal to the first planar surface and perpendicular to the linear elements 114 of the structure of uniformly periodic linear elements 111, i.e., along the direction of periodicity 116.

The arrangement of FIG. 1 may be used to calibrate an imaging optical device 105 by determining one or more optical properties of the imaging optical device 105 such as, but not limited to, a focal length, a magnification, a depth of field, a measure of field curvature or distortion, or some combination thereof.

This may, for instance, be done by determining a periodicity D of the imaged periodic structure in a position of sharpest focus. The required optical property or properties of the optical device may then be calculated using mathematical formulas involving the periodicity d, the acute angle α and the imaged periodicity D, as will be described in more detail below.

This optical property may then be used to adjust or alter an image taken by the calibrated optical device. For instance if the optical property is the magnification of the optical device, the alteration may, for instance, be adding one or more fiducial scale or distance markers to the image. If the optical property is distortion, the image may, for instance, automatically remove the distortion from the image to produce an undistorted image. In a further preferred embodiment of the invention, fiducial markers may be applied to the image and the distortion may be mathematically applied to produce more accurate measurements between those fiducial markers.

Figure 2:
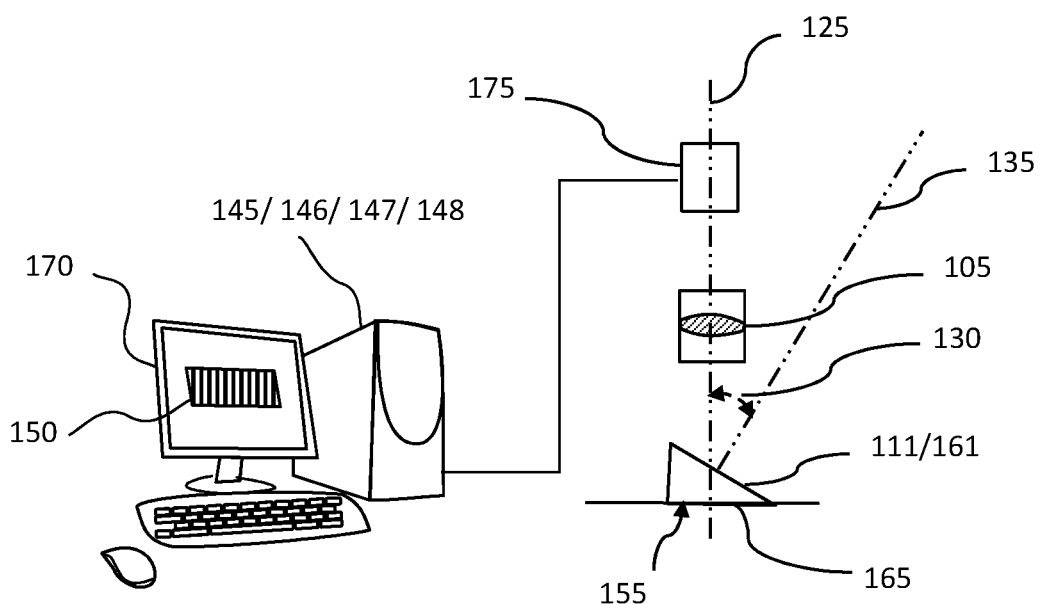
FIG. 2 shows a further isometric schematic layout of an optical measuring device of the present invention.

FIG. 2 shows a further isometric schematic layout of an optical measuring device of the present invention. In this embodiment, the structure of uniformly periodic linear elements 111 may be placed on a flat slanted surface that may, for instance, be the hypotenuse surface 161 of a right triangular prism or wedge 155.

Orienting the optical axis 125 of the optical device normal to a flat, base surface 165 of the wedge 155 may result in it being at an acute angle α 130 with respect to the normal 135 of the wedge's 155 hypotenuse surface 161.

Arranging for the optical axis to be vertical may easily and accurately be done using, for instance, a plumb-bob. Arranging for the base surface may easily and accurately be done using, for instance, a spirit level.

The angle between the hypotenuse surface 161 and the flat, base surface 165 may also be equal to the acute angle α 130. In a preferred embodiment, the acute angle α 130 may be in a range of 5 to 85 degrees, and more preferably in a range of 30 to 60 degrees and most preferably in a range of 45 degrees+/−5 degrees. Having the angle α 130 close to 45 degrees may, for instance, simplify some of the calculations necessary to arrive at the optical properties, and may, therefore, speed up the process. However, in some embodiments, the angle may range from 0 to 5 degrees.

The calibration image may be recorded by a digital image capture device 175 such as, but not limited to, a digital camera. The recorded digital image may then be transferred to a digital computer 145. The digital computer 145 may, for instance, contain a digital processor 146 and digital memory 147. A suitable set of instructions 148 may be stored in the digital memory 147 that may allow the digital processor 146 the necessary function to perform the calculations necessary to make the calculations described in more detail below. The digital computer 145, in part or in its entirety, may be located distant from the imaging device being tested, or "in the cloud" in current parlance. It may also, in part or entirely, actually be a part of the imaging device.

A digital display screen 170 may also be functionally connected to the digital computer 145 and may be used to display the digital image 150.

Figure 3:
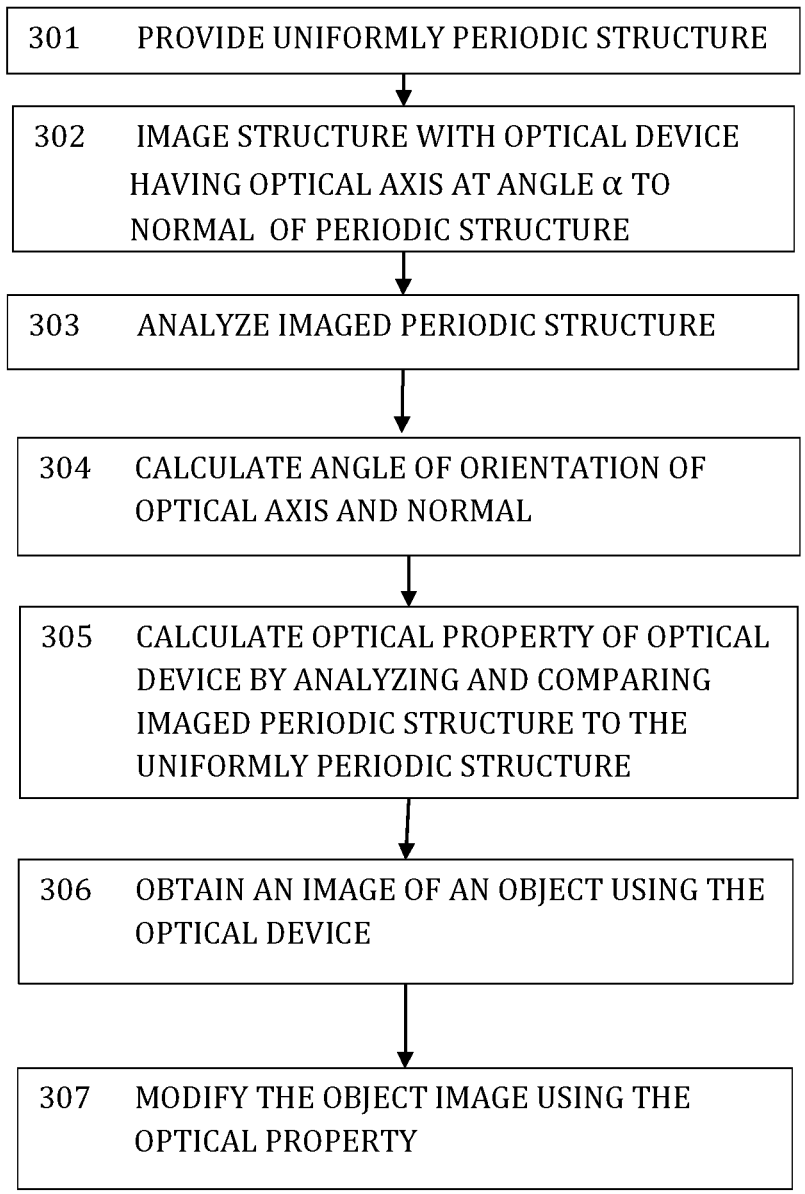
FIG. 3 shows a schematic flow diagram of some steps of the method of the present invention.

FIG. 3 shows a schematic flow diagram of some steps of the method of the present invention.

In step 301: Provide Uniformly Periodic Structure, a structure having uniformly periodic linear elements 111 on it, may be provided. One such structure may be the well-known Ronchi ruling or grating. A Ronchi ruling or grating may be a constant-interval bar and space square wave optical target that may have a high edge definition and contrast ratio. Ronchi rulings may be manufactured through photolithographic deposition of chrome on glass or optical substrates. Such a structure may be applied directly to the hypotenuse face of a precision wedge to form a Ronchi wedge.

The same, or similar, technology may also be used to produce a structure having the linear elements shaped and placed to form a sinusoidal grating placed directly on, or manufactured onto it. Such a sinusoidal grating may have sinusoidally varying height, opacity of reflectivity, or some combination thereof.

In step 302: Image Structure with Optical Device Having Optical Axis at Angle α to the Normal of the Periodic Structure, an image may be taken of the structure of uniformly periodic linear elements using the optical imaging device being calibrated.

In a preferred embodiment, the angle between the imaging devices optical axis and the grating surface may be achieved by having the linear elements on the hypotenuse surface of a wedge, and imaging perpendicularly down.

In a preferred embodiment, the image may be a digital image.

In step 303, this digital image of the periodic structure may be examined by, for example, transferring it as a matrix of pixels to the memory on a digital computer. This matrix may then be digitally processed using a programmed digital microprocessor.

For instance, a first step may be to determine orientation of the imaged grid (fringe) pattern with respect to the frame of the image.

The nominal orientation the fringes may be vertical, i.e. the assumption is that the lines of the fringes should be parallel to the edge of the image in one dimension and normal to them at the orthogonal edge.

Calculating the fringe angle the nominal vertical can be done simply, to a pixel accuracy, or using a more complex formula.

In the simple method, the algorithm simply compares two horizontal lines of pixels that are separated vertically from each other by N pixels. By cross-correlating those rows, a distance D that one has to be displaced horizontally to produce a maximum value or correlation peak can be found. The pixel accurate fringe angle ø is then given by the equation:

$$\varnothing = \text{Tan}(D/N) \quad (2)$$

The complex method makes use of finding the phase of a fundamental sine wave, or first harmonic of a row of pixels, i.e., the largest amplitude sine wave that is part of a set of Fourier terms that describe the row of fringes. This can be found by first normalizing the image of the grid to remove any intensity non-uniformity that might have been introduced by the imaging process. This can be accomplished using a low pass filter.

The $1^{st}$ harmonic, $l_1(x)=A \cos(2\pi x+\phi)$ can be found by applying a Fourier transform to the row of pixels, high pass filtering them to remove the less relevant elements of the Fourier transform, then applying an inverse Fourier transform.

The quadrature signal for this same row of pixels can be obtained by applying a Hilbert transform to the $1_{st}$ harmonic to obtain $l_2(x)=A \sin(2\pi x+\phi)$.

A phase $\phi$ between the two signals may be calculated as:

$$\phi = \arctan(l_1/l_2) \quad (3)$$

A zero degree phase angle can then be interpolated as a subpixel accurate location.

By calculating a separation Dp of the subpixel accurate zero degree phase angle on two different horizontal rows, N pixels apart, a more accurate fringe angle $$\varnothing = \text{Tan}(Dp/N) \quad (4)$$

Figure 4:
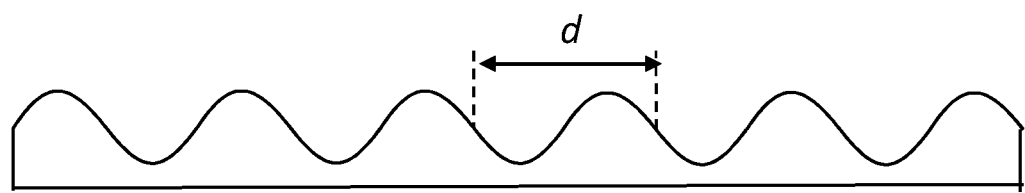
FIG. 4A shows a schematic cross-section of an exemplary uniformly periodic structure.
FIG. 4B shows a schematic cross-section of an exemplary imaged periodic structure.
FIG. 4C shows a depiction of a calibration image including a schematic, exaggerated view of a region of interest used to determine magnification of an optical device.
Figure 4:
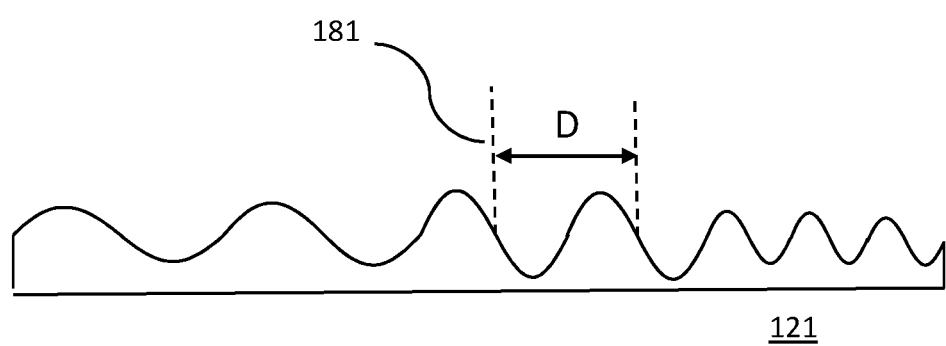
Figure 4:
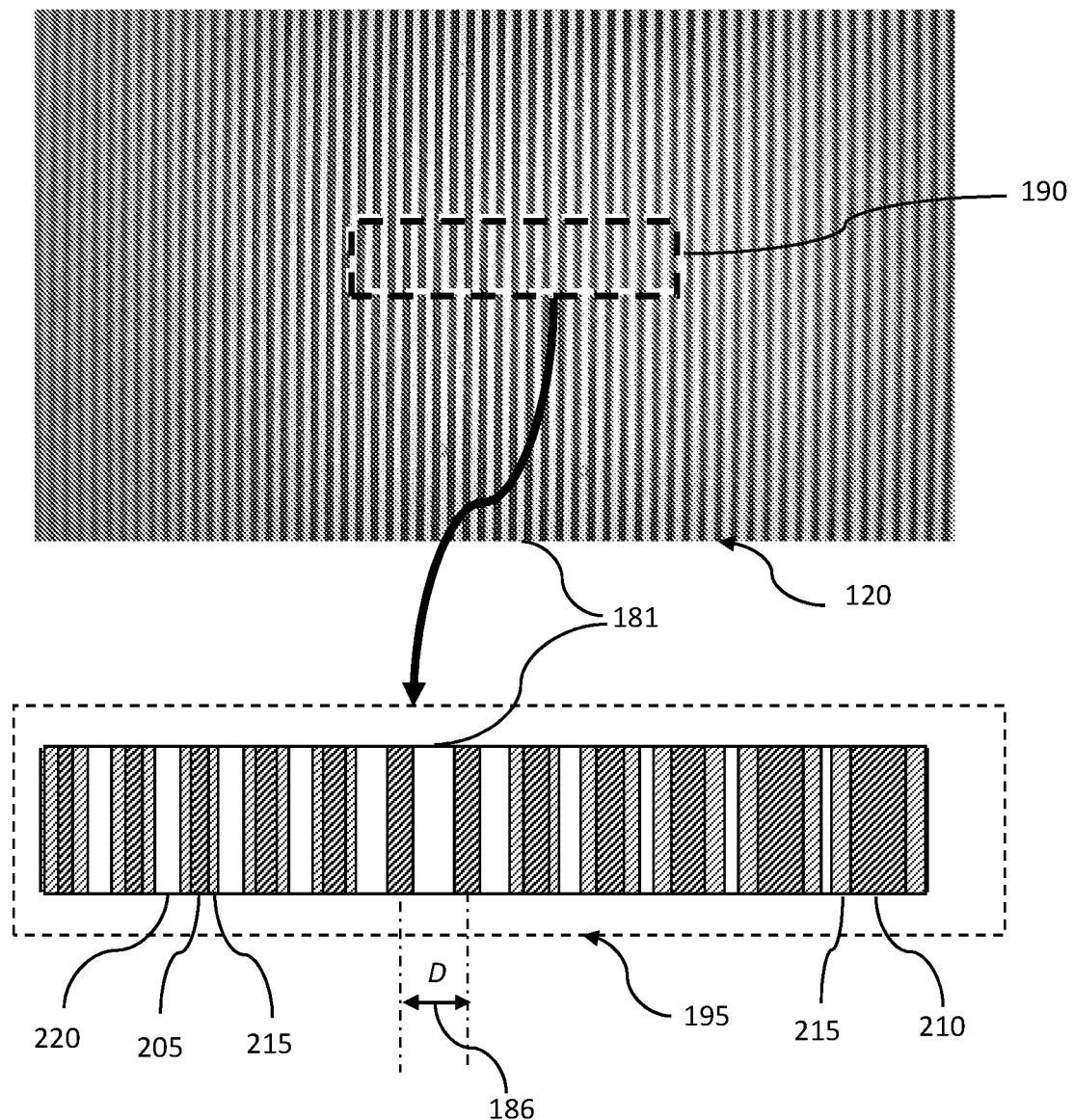

In Step 304: Calculate Angle of Orientation of Optical Axis and Normal. This is described in detail below in connection with FIG. 4.

In Step 305: Calculate Optical Property of Optical Device by Analyzing and Comparing Imaged Periodic Structure to the Uniformly Periodic Structure.

Such optical properties may include characteristics such as, but not limited to, best focus, optical focal length, depth of field, magnification, and distortion, or some combination thereof, as is discussed in detail below.

In Step 306: Obtain an Image of an Object Using the Optical Device, the optical device may be used to obtain an image that is preferably a digital object image.

In Step 307: Modify the Object Image using the Optical Property. This may take the form of using a digital processor to adjust the digital optical image taken in Step 306 using one of the optical properties calculated in Step 305. The image may, for instance, be altered in some way such as, but not limited to, having distortion removed using a knowledge of field curvature or distortion, or having fiducial makers placed on its base on a knowledge of the magnification, or some combination thereof.

FIG. 4A shows a schematic cross-section of an exemplary uniformly periodic structure. As shown the structure of uniformly periodic linear elements 111 has a period d and therefore a frequency 1/d. The structure of uniformly periodic linear elements 111 may, as shown in FIG. 4A, closely resemble a sine wave.

FIG. 4B shows a schematic cross-section of an exemplary imaged periodic structure. As shown in an exaggerated way in FIG. 4B, both the amplitude and the periodicity D may vary. This is due to the image being taken at an angle, resulting in a changing magnification across the field of view, and because the image only has one position of sharpest focus 181, with the image gradually going out of focus in both directions away from the position of sharpest focus 181. For only pixel accurate calculations, the periodicity D may however be taken as the periodicity at the position of sharpest focus 181.

FIG. 4C shows a plan view depiction of a calibration image including a schematic, exaggerated view of a region of interest used to determine magnification of an optical device.

A region of interest 190 may be selected from a calibration image 120. That region of interest 190 is shown as the magnified and exaggerated region of interest 195.

This region of interest 190 may be used to locate the position of sharpest focus 181 using a number of options such as, but not limited to, edge detection, high spectral frequency detection, or modulation strength, or a combination thereof.

Edge detection typically measures edge strength.

On the right side of the region of interest 190 there are lines 210 that are more magnified than the lines at sharpest focus 181 and have a greater blurring 215 than the lines at position of sharpest focus 181.

Similarly, on the left side of the region of interest 190 there are lines 205 that are less magnified than the lines at sharpest focus 181, but also have a greater blurring 215 than the lines at position of sharpest focus 181.

Edge detection can use these lines to measure the edge strength of each line. This edge strength may then be plotted as a focus function, with edge strength on a vertical axis and line position on the horizontal axis. This focus function may then be thresholded to eliminate "dead space" where edge data is missing. A suitable curve such as, but not limited to, a Gaussian or a parabola may then be fitted to the focus function. The peak of such a curve may then indicate a subpixel accurate position of sharpest focus 181.

Modulation strength may be used in a similar fashion. Modulation strength is a measure of the line intensity above the local background 220 intensity, i.e., the ratio of the peak to the valley. This modulation strength may be plotted as a focus function, with modulation strength on a vertical axis and line position, perpendicular to the direction of the fringe pattern, on the horizontal axis. This focus function may then be thresholded to eliminate "dead space" where edge data is missing. A suitable curve such as, but not limited to, a Gaussian or a parabola may then be fitted to the focus function. The peak of such a curve may then indicate a subpixel accurate position of sharpest focus 181.

A further approach is to use high spectral frequency detection.

This may be used because perfect image of a Ronchi ruling may consist of alternating regions of dark and bright lines. A single row of pixels may, therefore, exhibit a square wave pattern, i.e., a dark region followed by a bright region. Each region of a well-focused image may have uniform intensity. Mathematically, this square wave may be represented as the sum of sine waves starting with the fundamental frequency (f) of the ruling pattern and adding decreasing amounts of each higher harmonic frequency (2f, 3f, 4f, . . . ).

A defocused image of this ruling may, however, have the harmonic frequencies of the suppressed, and the suppression effect may be stronger for the higher order harmonics, and may also be stronger for more defocus, so that a defocused image of the Ronchi ruling may resemble a sine wave. This effect may be used to estimate how well the focus is by filtering out the fundamental frequency, leaving only the higher order harmonics. The regions that become progressively more out-of-focus may contain fewer higher-order harmonics. The part of the image with the most higher-order harmonics may, therefore, be the part that is best focused.

By repeating this for each row of pixels, the position of sharpest focus 181 for each row may be calculated.

Having found the position of sharpest focus, the periodicity D in this region may be measured and compared to the periodicity d of structure of uniformly periodic linear elements. As the linear elements spaced with periodicity d are on a slope of angle α, the magnification m may be calculated using the formula:

$$m=D/(d\cos(\alpha)) \quad (5)$$

Figure 5:
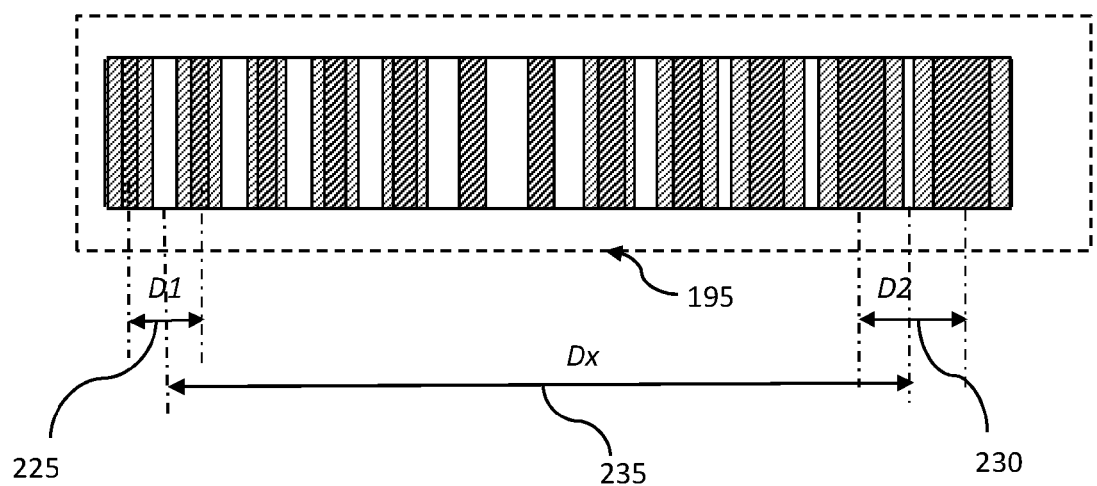
FIG. 5 shows an exaggerated, schematic view of a region of interest of a calibration image used to determine an effective focal length of an optical device.

FIG. 5 shows an exaggerated, schematic view of a region of interest of a calibration image used to determine an effective focal length of an optical device.

The effective focal length ef of an optical device may be automatically obtained using an algorithm that obtains at least the magnifications $m_1$ and $m_2$ at two locations $x_1$ and $x_2$ in said calibration image, the two locations being separated by a distance Dx measured parallel to the direction of periodicity of the grating.

The magnifications $m_1$ and $m_2$ may be calculated by determining the periodicity $d_1$ at location $x_1$ 225, the periodicity $d_2$ at location $x_2$ 230. The magnifications $m_1$ and $m_2$ may then be given by:

$$m_1=d_1/d \quad (6)$$

$$m_2=d_2/d \quad (7)$$

Where d is the periodicity of the original grid.

The vertical distance Hx (not shown) between the points on the original grid imaged to $x_1$ and $x_2$ may be calculated using the method described below in connection with determining the depth of focus, described in connection with FIG. 6.

The effective focal length ef may then be described by the equation:

$$ef=f(m_1,m_2,Hx) \quad (8)$$

In a preferred embodiment, a greater number of magnifications may be calculated, each at additional point. These added measurements may then be combined to produce a more accurate result. Alternately, a function may be fitted to the multiple measurements using an equation containing the focal length and resulting magnification at a distance, to produce an estimate of the focal length using all of the measurements made.

Figure 6:
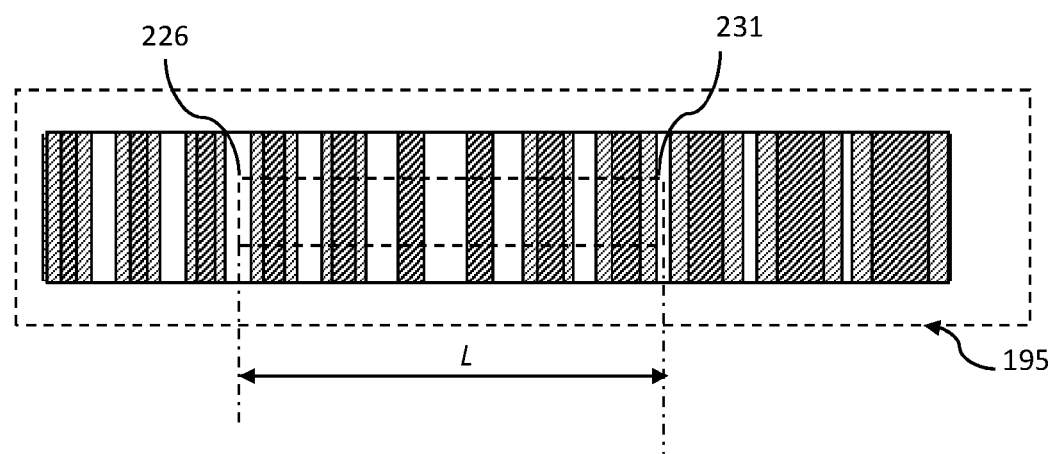
FIG. 6 shows an exaggerated schematic view of a region of interest of a calibration image used to determine a depth of field of an optical device.

FIG. 6 shows an exaggerated schematic view of a region of interest of a calibration image used to determine a depth of field of an optical device.

In order to determine the acceptable field of view, an acceptable degradation of focus, fd needs to be determined. This may for instance be done using edge detection, which typically measures edge strength; or using modulation strength, which is a measure of the line intensity above the local background 220 intensity, i.e., the ratio of the peak to the valley.

By defining an acceptable threshold fd of either edge strength, or modulation strength, a digital processor may be programmed to automatically locate a first position 226 where the threshold is met on a magnified region of interest 195 of a digital calibration image stored in a computer memory. Similarly, a second position 231 may be located where the threshold is reached going in the other direction from the position of optimum focus.

By measuring the length L between the first and the second positions, and knowing the angle α that the optical axis of the device is oriented with respect to a normal to the planar surface on which the uniformly periodic structure is situated, the vertical distance on the original grating along the axis of the lens between the first and second positions can be calculated. This vertical distance may be the depth of focus df of the imaging device and may be calculated by the formula:

$$df=L\cos(\alpha) \quad (9)$$

Figure 7:
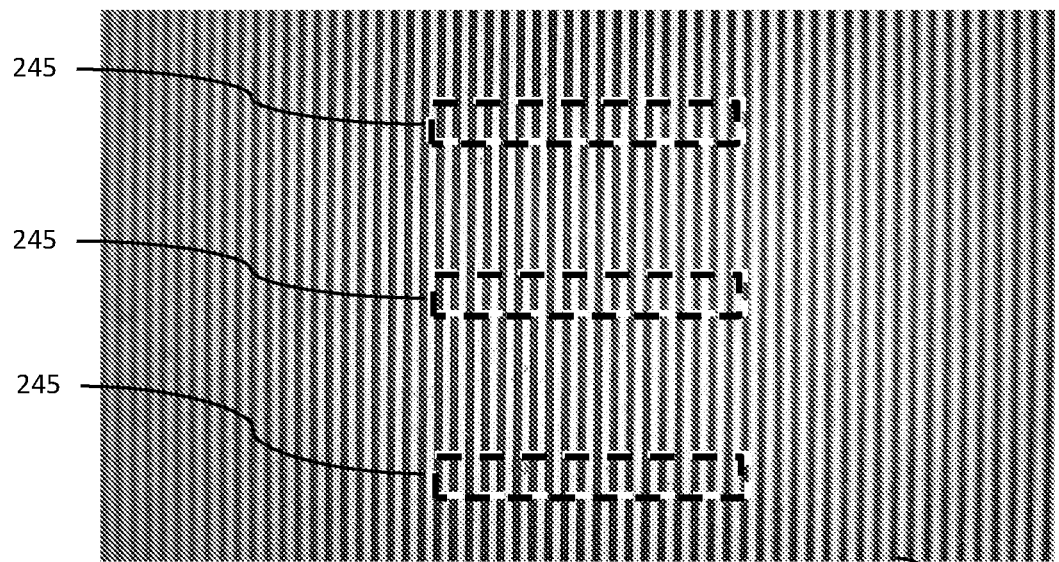
FIG. 7 shows a depiction of a calibration image and three regions of interest used to determine a field curvature of an optical device.

FIG. 7 shows a depiction of a calibration image and three regions of interest used to determine a field curvature of an optical device.

Three horizontally oriented regions of interest 245 separated from each other by a distance measured parallel to the parallel lines are obtained from a calibration image 120.

Figure 8:
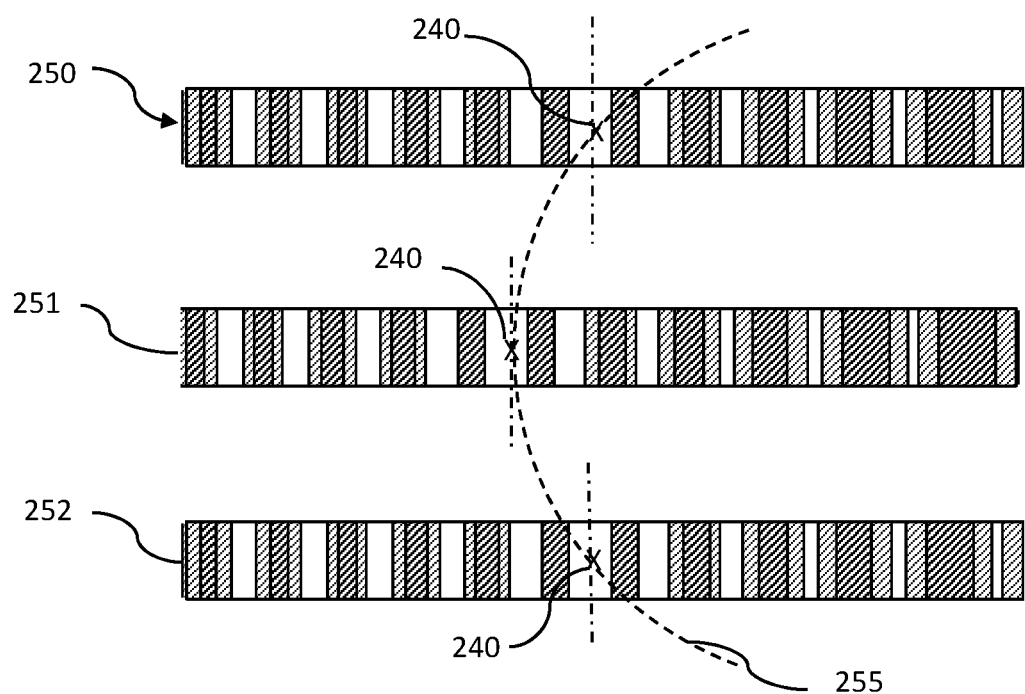
FIG. 8 shows an exaggerated schematic view of three regions of interest of a calibration image used to determine a field curvature of an optical device.

FIG. 8 shows an exaggerated schematic view of three regions of interest of a calibration image used to determine a field curvature of an optical device.

This may be done by first determining a focal position $f_{xy}$ 240 at least of each of an upper strip 250, a middle strip 251 and a lower strip 252 of the calibration image.

The focal position $f_{xy}$, 240 may, for instance, be done using the method for finding a position of sharpest focus detailed above.

In this method, edge detection may measure the edge strength of each line. This edge strength may then be plotted as a focus function, with edge strength on a vertical axis and line position on the horizontal axis. This focus function may then be thresholded to eliminate "dead space" where edge data is missing. A suitable curve such as, but not limited to, a Gaussian or a parabola may then be fitted to the focus function. The peak of such a curve may then indicate a subpixel accurate position of sharpest focus that may be translated into a focal position $f_{xy}$, 240 by measuring the y position of the line of pixels analyzed.

An analogous process can be done using modulation strength. This may be a measure of the line intensity above the local background intensity, i.e., the ratio of the peak to the valley.

Having found a focal position $f_{xy}$, 240 for each region, a curve 255 may be fitted to the focal points. That curve 255 may be the field curvature c of the lens, or may be an indicator of the field curvature.

Figure 9:
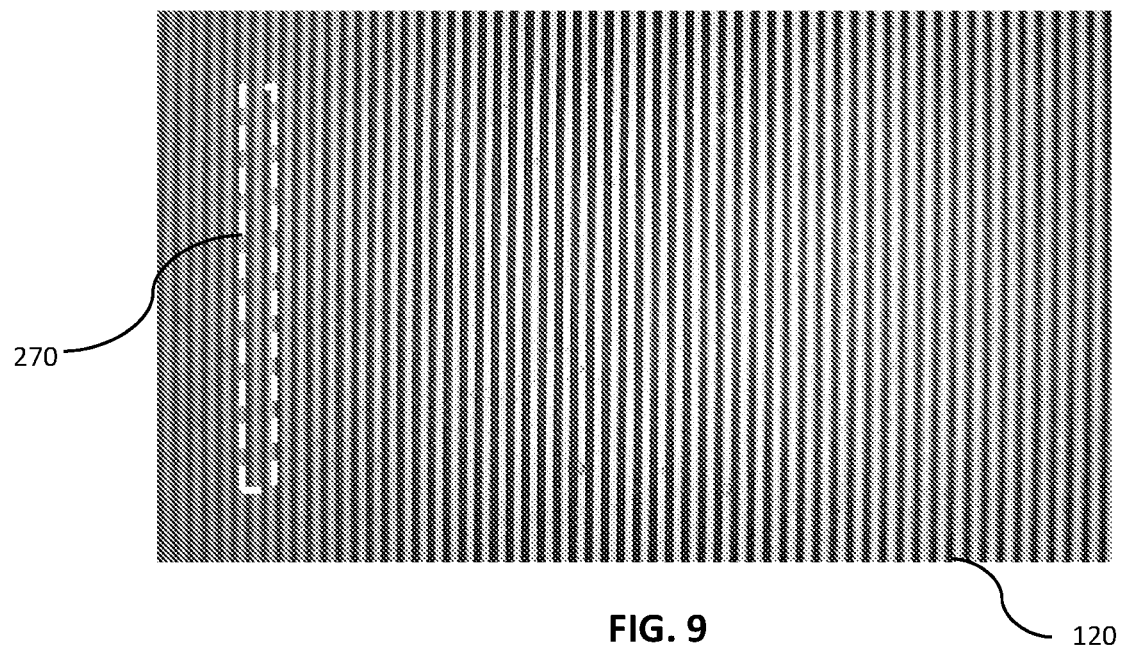
FIG. 9 shows a depiction of a calibration image and a region of interest used to determine a distortion of an optical device.

FIG. 9 shows a depiction of a calibration image and a region of interest used to determine a distortion of an optical device. In this instance one of the parallel lines 270 of the calibration image 120 may be selected using a vertical region of interest.

Figure 10:
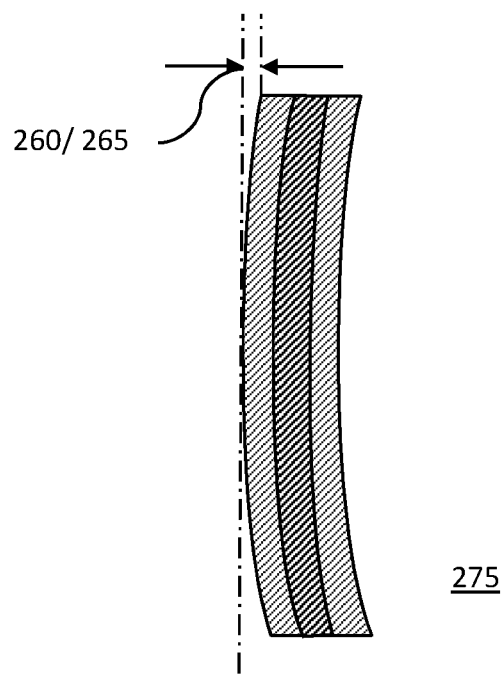
FIG. 10 shows an exaggerated schematic view of a region of interest of a calibration image used to determine a distortion of an optical device.

FIG. 10 shows an exaggerated schematic view of a region of interest of a calibration image used to determine a distortion of an optical device.

The exaggerated view 275 of a selected parallel line is depicted in two shadings to indicate blurring at an edge.

The curvature 265 of one or more of the parallel lines may be obtained using the same or similar algorithms as discussed above with regard to FIG. 8 in connection with determining a field of curvature.

Once the curvature 265 of a line has been determined, the distortion dx 260 may be defined as the distance between a tangent to the curve and drawn parallel to the nominal vertical direction of the lines in the grid, measured horizontally at a selected point at which the distortion is required to be measured.

Figure 11:
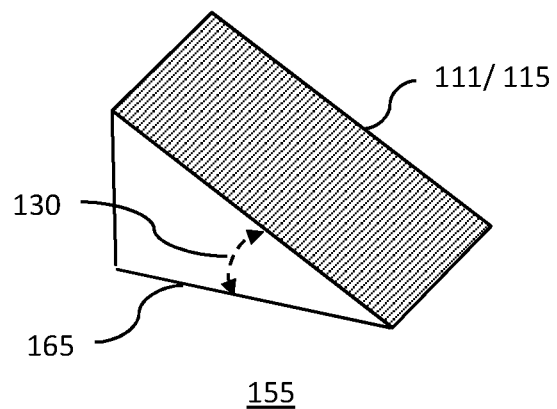
FIG. 11 shows a schematic, isometric view of one preferred embodiment of a wedge of the present invention.

FIG. 11 shows a schematic, isometric view of one preferred embodiment of a wedge of the present invention.

The wedge 155 has a flat, base surface 165 and a first planar surface 115. The first planar surface 115 contains a structure of uniformly periodic linear elements 111 and is separated from the flat, base surface 165 by an acute angle α 130.

The wedge 155 may be machined, additively manufactured or extruded from any suitable material such as, but not limited to, plastic, glass, aluminum, stainless steel or titanium, or some combination thereof.

The wedge 155 may also be composed of at least two elements such as, but not limited to, the triangular prism itself and a separate structure attached to the hypotenuse of the triangular prism that may be the structure of uniformly periodic linear elements 111. The structure of uniformly periodic linear elements 111 may, for instance, be a well-known Ronchi ruling.

Figure 12:
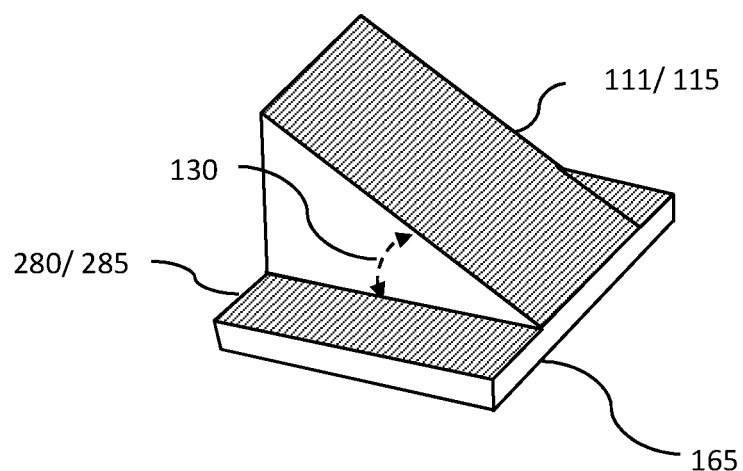
FIG. 12 shows a schematic, isometric view of a further preferred embodiment of a wedge device of the present invention.

FIG. 12 shows a schematic, isometric view of a further preferred embodiment of a wedge device of the present invention.

The wedge device shown in FIG. 12 has the planar surface 115 with uniformly periodic linear elements 111 having a first periodicity, separated from a flat, base surface 165 by the acute angle α 130. In addition there is a second flat plane 285 having a second structure of uniformly periodic linear elements 280. The periodicity of the first and second uniformly periodic elements may, or may not, have the same periodicity. Having the same periodicity may, for instance, reduce manufacturing costs, while having different periodicities may, for instance, simplify the analysis of calibration images.

As the second flat plane may be located adjacent to the first flat plane, with the linear elements each being oriented parallel to each other device, imaging of the second uniformly periodic structure may be used to obtain a measure of an angle between said optical axis of the optical device and a normal to the flat base surface. This measurement may either be used to orient the optical axis of the imaging device to be normal to the flat, base surface 165, or it may be used with the known acute angle α 130 to more accurately measure the actual angle between the optical axis of the imaging device and the normal to the first planar surface 115.

For instance, using the methods described above in connection with FIG. 6 in determining the depth of focus.

For instance, the tilt of the flat, base surface 165 may be determined by methods such as, but not limited to, using edge detection or modulation detection to determine magnifications at two positions separated along a distance perpendicular to the direction of the linear elements. Knowing the distance between the two measured magnifications, the tilt, i.e., the angle to which the optical axis of the imaging device is not perpendicular to the flat, base surface 165 may then be determined by rearranging the equations above to solve for the angle.

Figure 13:
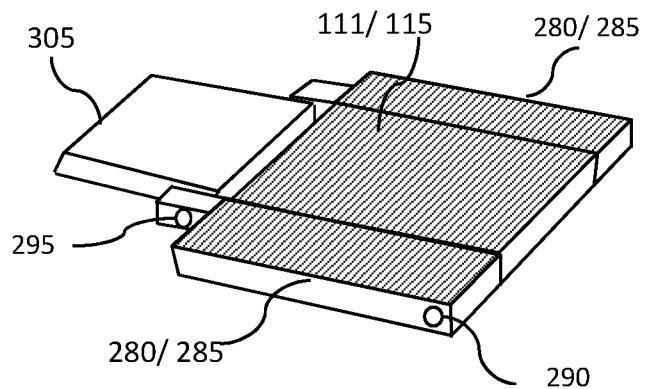
FIG. 13A shows a schematic, isometric view of yet a further preferred embodiment of a wedge device of the present invention arranged for storage.
FIG. 13B shows a schematic, isometric view of yet a further preferred embodiment of a wedge device of the present invention arranged for use.
Figure 13:
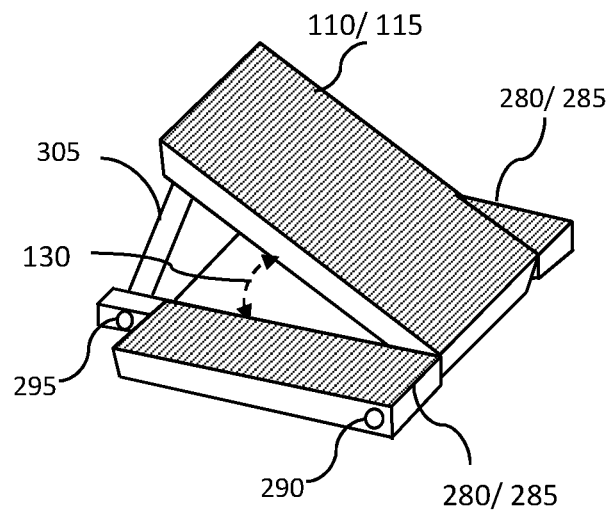

FIG. 13A shows a schematic, isometric view of yet a further preferred embodiment of a wedge device of the present invention arranged for storage while FIG. 13B shows the wedge device arranged for use.

The first planar surface 115 having the first uniformly periodic linear elements 111 may be attached to the second flat plane 285 having the second uniformly periodic linear elements 280 by a first pivot 290.

There may also be a pivoting support piece 305 attached to the second flat plane 285 by a second pivot 295.

When arranged for storage, as shown in FIG. 13A, the first planar surface 115 may be pivoted down so that it is parallel with the second flat plane 285, while the pivoting support piece 305 is also arranged to be parallel to the second flat plane 285. This arrangement makes the device convenient for storage and for transportation.

When arranged for use, as shown in FIG. 13B, both the first planar surface 115 and the pivoting support piece 305 have been pivoted up so that the first planar surface 115 may now be supported by the pivoting support piece 305 at a required acute angle α 130. This arrangement may be held in place by a suitable latching element temporary fixing the first planar surface 115 to the pivoting support piece 305. This latching may, for instance, be done mechanically or using suitable magnets.

Figure 14:
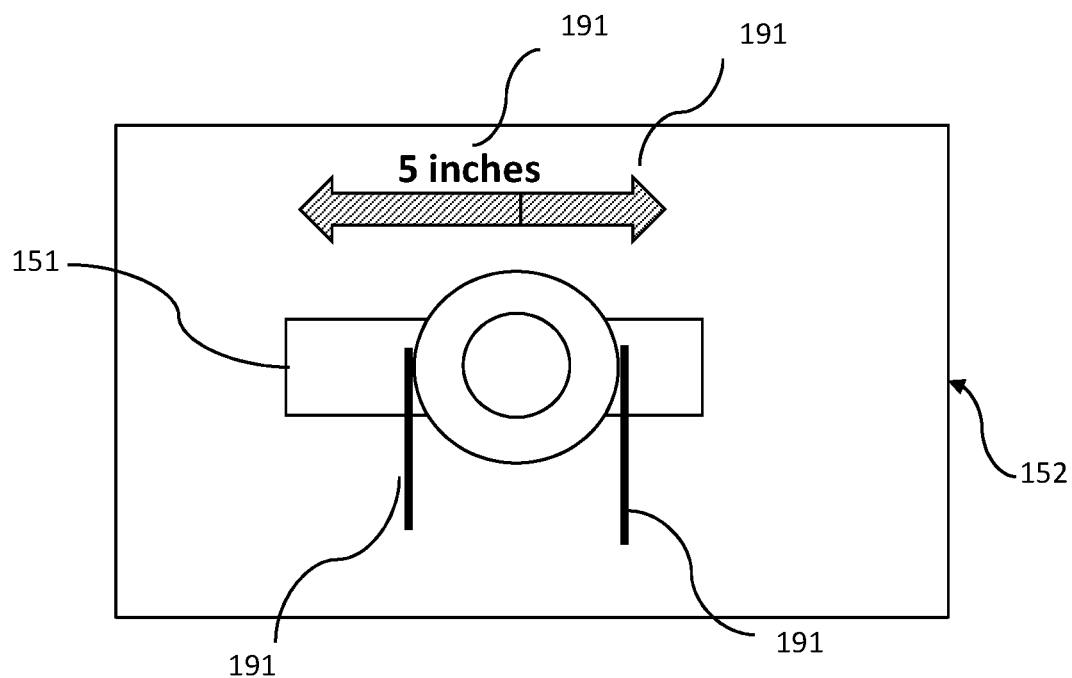
FIG. 14 shows a schematic, front view of an object image having fiducial markers added using the method of this invention.

FIG. 14 shows a schematic, front view of an object image having fiducial markers added using the method of this invention.

The object image 152 may have an image of an object 151 taken using the imaging device. The object image 152 may then have one or more fiducial markers 191 added to or associated with the image. These fiducial marker 191 may rely on optical properties of the imaging device determined during calibration using one or more of the methods described above such as, but not limited to, magnification. The fiducial marker 191 may take the form of additions such as, but not limited to, scale readings, show limits or desired sizing, a circular or arc radius or diameter, linear distance or angle between image features, or some combination thereof.

Although this application has been described with regard to the situation in which the structure of uniformly periodic linear elements has the linear elements perpendicular to the sides of the wedge, one of skill in the optical and mathematical arts may apply similar methodologies as those described in the application, to a wedge device in which the linear elements are parallel to the sides of the wedge.

For instance, a point of best focus with such a wedge may be calculated by taken a number of regions of the calibration images normal to the imaged linear elements. A degree of focus may then be found in each of these regions, and by then fitting a curve to those measurements, a sub-pixel determination of the point of best focus may be made.

Similar methods may be used to obtain other optical properties of the imaging device using such a wedge in which the lines are parallel to the edges of the wedge.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of calibrating an imaging optical device, comprising:
   providing, using an element independent and unattached to the imaging optical device, a structure of uniformly periodic linear elements having a periodicity D d located on a first planar surface, and where the linear elements of the structure are oriented perpendicular to the direction of periodicity of the structure;
   recording a calibration image of said uniformly periodic structure using said optical device while an optical axis of said optical device is oriented at an acute angle α, in a range of 5 to 85 degrees, with respect to a normal of said first planar surface;
   determining an imaged periodicity function d D(x,y) of the imaged periodic structure, fitting a function to the periodicity values over the image and calculating the periodicity D at a location in a region of sharpest focus; and calculating an optical property of said optical device using said periodicity D d, said acute a d said imaged periodicity d D and a function that describes periodicity values over the image.

2. The method of claim 1 further comprising adding a fiducial marker calculated using said optical property to an object image of an object taken using said imaging optical device.

3. The method of claim 2 further comprising providing a digital computer functionally connected to said imaging optical device, said digital computer comprising a digital processor and a digital memory and wherein said calibration image and said object image are digital images stored in said digital memory.

4. The method of claim 3 wherein said digital computer er comprises a set of instructions stored in said digital memory that enable said digital processor to automatically perform the function of locating said position of sharpest focus using an analysis of said imaged periodic structure in said calibration image.

5. The method of claim 4 wherein said analysis comprises calculating a first harmonic of a Fourier series derived from said imaged periodic structure.

6. The method of claim 4 wherein said optical property is a magnification m of said optical device, and wherein said set of instructions stored in said digital memory further enable said digital processor to perform the function of automatically obtaining said magnification m using an algorithm comprising a calculation equivalent to the equation:

$$m = D/(d \cos(\alpha)).$$

7. The method of claim 3 wherein said optical property is an effective focal length ef of said optical device and wherein said set of instructions stored in said digital memory further enable said digital processor perform the function of automatically obtaining said effective focal length ef of said optical device using an algorithm that comprises obtaining the magnifications $m_1$ and $m_2$ at two locations $x_1$ or and $x_2$ in said calibration image, said two locations being separated by a distance Dx measured parallel to said direction of periodicity, and wherein said set of instructions stored in said digital memory further enable said digital processor perform the function of automatically calculating the effective height difference Hx between said two locations.

8. The method of claim 7 wherein said set of instructions stored in said digital memory further enable said digital processor perform the function of automatically obtaining said effective focal length ef using an algorithm that comprises a calculation equivalent to the equation:

$$ef = f(m_1, m_2, Hx).$$

9. The method of claim 3 wherein said optical property is a depth of field df of said optical device, and wherein said set of instructions stored in said digital memory further enable said digital processor perform the function of automatically obtaining said depth of field df of said optical device using an algorithm comprising obtaining a position of acceptable focus furthest from said position of sharpest focus measured perpendicular to an orientation of said structure of uniformly periodic linear elements.

10. The method of claim 3 wherein said optical property is a field curvature c of said optical device and wherein said digital computer is further programmed to perform the function of automatically obtaining said field curvature c of said optical device using an algorithm comprising obtaining a focal position $f_{xy}$ on said calibration image at two or more positions, said positions separated by a distance measured normal to said direction of periodicity 116.

11. The method of claim 3 wherein said optical property is a distortion dx of said optical device and wherein said digital computer is further programmed to perform the function of automatically obtaining said distortion dx of said optical device using an algorithm comprising obtaining a curvature of one or more of said imaged linear elements.

12. A device for facilitating the method of claim 1, said device comprising:
    a wedge having a flat, base surface;
    a flat slanted surface; and
    two sides;
    wherein said flat, slanted surface is angled at said acute angle with respect to said flat, base surface; and
    wherein said structure of uniformly periodic linear elements having a periodicity includes an element independent and unattached to the imaging optical device and is located on said flat, slanted surface and where said linear elements are parallel to said base surface or said two sides and wherein said taking an image of said structure of uniformly periodic linear elements with said optical device occurs with the optical axis of said optical device oriented normal to said flat base surface or said two sides.

13. The device of claim 12 further comprising:
    a second structure of uniformly periodic linear elements having a periodicity $d_2$ and being located on a second flat plane; and
    wherein said second flat plane is located adjacent to said flat plane and parallel to said plane with the linear elements of said second structure of uniformly periodic linear elements being oriented parallel to said linear elements of said structure of uniformly periodic linear elements, such that imaging of said second uniformly periodic structure is used to obtain a measure of an angle between said optical axis of said optical device and said normal to said flat base surface.

14. The device of claim 13 wherein said second flat plane is swivelingly connected to said flat plane such that said second flat plane is movable from a first position in which it is oriented parallel to said plane and a second position in which it is oriented at an angle α with respect to said plane.

15. A method of calibrating an imaging optical device, comprising:
    providing, using an element independent and unattached to the imaging optical device, a structure of uniformly periodic linear elements having a periodicity D d located on a first planar surface, and where the linear elements of the structure are oriented perpendicular to the direction of periodicity of the structure;
    recording a calibration image of said uniformly periodic structure using said optical device while an optical axis of said optical device is oriented at an acute angle α, in a range of 0 to 5 degrees, with respect to a normal of said first planar surface;
    determining an imaged periodicity function d D(x,y) of the imaged periodic structure fitting a function to the periodicity values over the image and calculating the periodicity D at a location in a region of sharpest focus; and
    calculating an optical property of said optical device using said periodicity D d, said acute angle α and said imaged periodicity d D and a function that describes periodicity values over the image.

16. The method of claim 1 wherein said structure of the uniformly periodic linear elements having said periodicity is produced on a digital display and produced using pixels of the digital display.

17. The method of claim 15 further comprising adding a fiducial marker calculated using said optical property to an object image of an object taken using said imaging optical device.

18. The method of claim 17 further comprising providing a digital computer functionally connected to said imaging optical device, said digital computer comprising a digital processor and a digital memory and wherein said calibration image and said object image are digital images stored in said digital memory.

19. The method of claim 18 wherein said digital computer further comprises a set of instructions stored in said digital memory that enable said digital processor to automatically perform the function of locating said position of sharpest focus using an analysis of said imaged periodic structure in said calibration image.

20. The method of claim 19 wherein said analysis comprises calculating a first harmonic of a Fourier series derived from said imaged periodic structure.

21. The method of claim 19 wherein said optical property is a magnification m of said optical device, and wherein said set of instructions stored in said digital memory further enable said digital processor to perform the function of automatically obtaining said magnification m using an algorithm comprising a calculation equivalent to the equation:

$$m = D/(d \cos(\alpha)).$$

* * * * *